(12) United States Patent
Sun et al.

(10) Patent No.: US 12,293,457 B2
(45) Date of Patent: May 6, 2025

(54) POSITIONING METHOD BASED ON SEMANTIC INFORMATION, DEVICE AND COMPUTER-READABLE STORAGE MEDIUM

(71) Applicant: UBTECH ROBOTICS CORP LTD, Shenzhen (CN)

(72) Inventors: Tiecheng Sun, Shenzhen (CN); Jichao Jiao, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 200 days.

(21) Appl. No.: 18/220,835

(22) Filed: Jul. 12, 2023

(65) Prior Publication Data

US 2024/0020923 A1   Jan. 18, 2024

(30) Foreign Application Priority Data

Jul. 13, 2022   (CN) .......................... 202210854066.1

(51) Int. Cl.
*G06T 17/05*   (2011.01)
*G06T 5/40*   (2006.01)
(Continued)

(52) U.S. Cl.
CPC ................ *G06T 17/05* (2013.01); *G06T 5/40* (2013.01); *G06T 7/11* (2017.01); *G06T 7/12* (2017.01);
(Continued)

(58) Field of Classification Search
CPC ...... G06V 10/44; G06V 10/761; G06V 10/26; G06V 10/757; G06V 20/64; G06V 10/462; G06T 5/40; G06T 17/05; G06T 7/11; G06T 7/12; G06T 2207/10028; G06T 2207/10016; G06T 7/194; G06T 7/579; G06T 2207/10024; G06T 2210/56; G06T 2210/61; G06T 17/00; G06T 7/73; G06T 7/10; G06T 11/00
See application file for complete search history.

(56) References Cited

U.S. PATENT DOCUMENTS

| 11,748,901 B1* | 9/2023 | Knuffman ............... G06T 7/579 345/419 |
| 2021/0225090 A1* | 7/2021 | Tang ..................... G06T 19/003 |

(Continued)

*Primary Examiner* — Phi Hoang (57) ABSTRACT

A method includes: performing semantic segmentation on an RGBD image to obtain a semantic label of each pixel of the image; performing reconstruction of a point cloud based on the image and mapping the semantic label of each pixel of the image into the point cloud to respectively obtain a semantic point cloud of a current frame with the semantic labels and a three-dimensional scene semantic map with the semantic labels; generating two-dimensional discrete semantic feature points for each of three-dimensional semantic point clouds in the current frame and the semantic map to obtain a corresponding two-dimensional semantic feature point image, and performing a three-dimensional semantic feature description on each feature point in the two-dimensional semantic feature point image; and performing feature matching on all feature points in the current frame and all feature points in the semantic map to obtain positioning information based on the three-dimensional semantic feature description.

20 Claims, 9 Drawing Sheets

(51) Int. Cl.
  *G06T 7/11*   (2017.01)
  *G06T 7/12*   (2017.01)
  *G06V 10/44*  (2022.01)
  *G06V 10/74*  (2022.01)

(52) U.S. Cl.
  CPC ............ *G06V 10/44* (2022.01); *G06V 10/761* (2022.01); *G06T 2207/10028* (2013.01)

(56) References Cited

U.S. PATENT DOCUMENTS

| | | | | |
|---|---|---|---|---|
| 2022/0156968 | A1* | 5/2022 | Du | G06T 17/00 |
| 2022/0301173 | A1* | 9/2022 | Cheng | G06F 18/22 |
| 2022/0319046 | A1* | 10/2022 | Bao | G06V 20/653 |
| 2022/0327833 | A1* | 10/2022 | Sambo | G06T 7/579 |
| 2023/0184949 | A1* | 6/2023 | Huang | G06V 10/40 |
| | | | | 356/4.01 |
| 2023/0267615 | A1* | 8/2023 | Agia | G01S 17/42 |
| | | | | 345/419 |
| 2024/0338938 | A1* | 10/2024 | Filimonov | G06V 20/70 |

\* cited by examiner

POSITIONING METHOD BASED ON SEMANTIC INFORMATION, DEVICE AND COMPUTER-READABLE STORAGE MEDIUM

CROSS REFERENCE TO RELATED APPLICATIONS

This application claims priority to Chinese Patent Application No. 202210854066.1, filed Jul. 13, 2022, which is hereby incorporated by reference herein as if set forth in its entirety.

TECHNICAL FIELD

The present disclosure generally relates to simultaneous localization and mapping (SLAM), and particularly to a positioning method based on semantic information, device and computer-readable storage medium.

BACKGROUND

Due to the lack of semantic information in the conventional localization and mapping (i.e., SLAM) system positioning methods, it completely relies on geometric features and visual features in the positioning process. In the absence of semantic information, it needs to traverse the entire map to search for the location that best matches the current location information. Thus, the positioning algorithms for the conventional SLAM system positioning methods are relatively time-consuming and tend to generate false matches. Especially in visual SLAM, the positioning methods based on visual features are extremely susceptible to illumination changes and scene changes, and they are also extremely sensitive to dynamic scenes, which affects positioning accuracy.

Therefore, there is a need to provide a positioning method based on semantic information to overcome the above-mentioned problem.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

Figure 1:
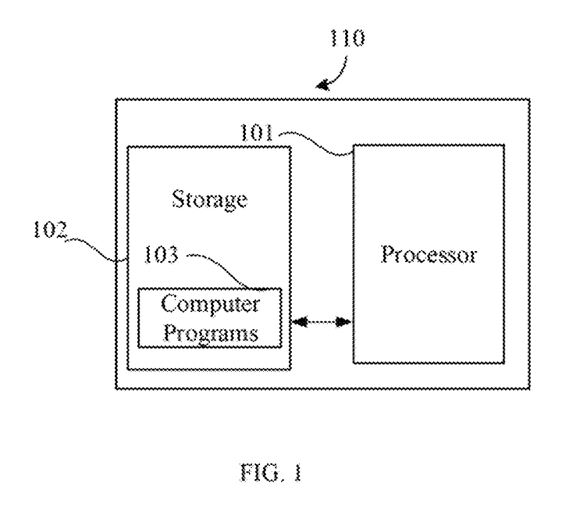
FIG. 1 is a schematic block diagram of a device according to one embodiment.

FIG. 1 shows a schematic block diagram of a device 110 according to one embodiment. The device 10 may be, but not limited to, a robot, an unmanned vehicle, and the like. The device 110 may include a processor 101, a storage 102, and one or more executable computer programs 103 that are stored in the storage 102. The device 110 may further include sensing units, such as depth cameras, lidar, etc., which can be selected according to actual needs.

Figure 2:
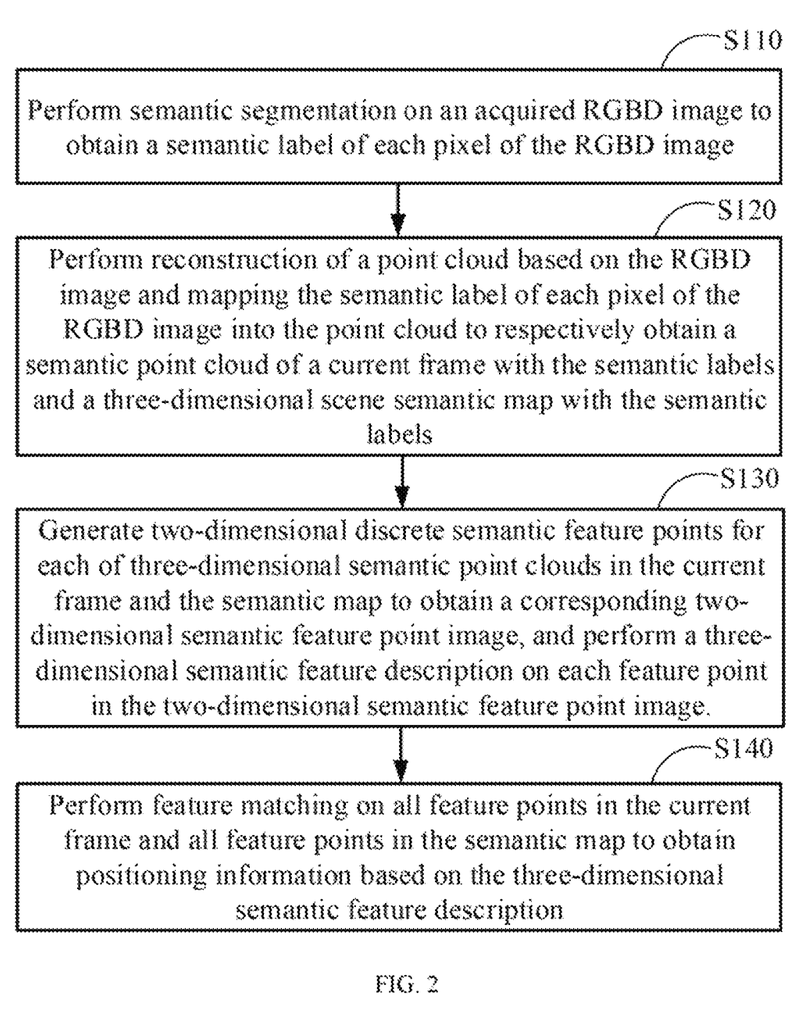
FIG. 2 is an exemplary flowchart of a positioning method according to one embodiment.

The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of the center-of-mass motion planning method, such as steps S110 to S140 in FIG. 2 are implemented. By implementing the method described in the embodiments below, it can effectively solve the positioning problem that cannot be solved in the conventional SLAM system under the condition of dynamic changes and illumination changes, etc.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random-access memory (RAM), a read only memory (ROM), a programmable read only memory (PROM), an erasable programmable read-only memory (EPROM), and an electrical erasable programmable read-only memory (EEPROM). The storage 102 may be an internal storage unit of the device 110, such as a hard disk or a memory. The storage 102 may also be an external storage device of the device 110, such as a plug-in hard disk, a smart memory card (SMC), and a secure digital (SD) card, or any suitable flash cards. Furthermore, the storage 102 may also include both an internal storage unit and an external storage device. The storage 102 is to store computer programs, other programs, and data required by the device 110. The storage 102 can also be used to temporarily store data that have been output or is about to be output.

Figure 9:
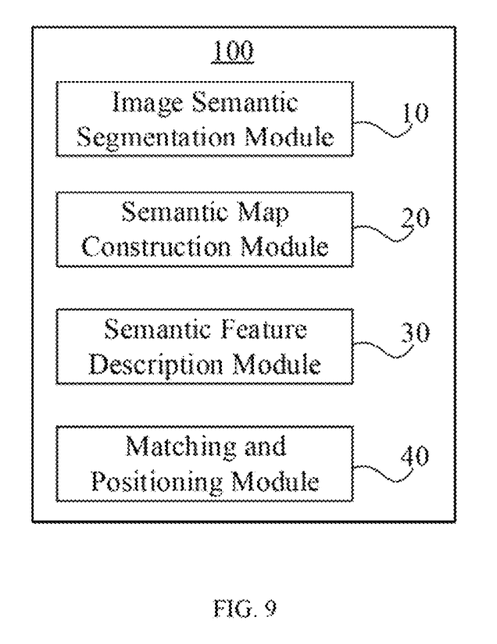
FIG. 9 is schematic block diagram of a semantic information-based positioning device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the device 110. For example, the one or more computer programs 103 may be divided into an image semantic segmentation module 10, a semantic map construction module 20, a semantic feature description module 30, and a matching and positioning module 40 as shown in FIG. 9.

It should be noted that the block diagram shown in FIG. 1 is only an example of the device 110. The device 110 may include more or fewer components than what is shown in FIG. 1, or have a different configuration than what is shown in FIG. 1. Each component shown in FIG. 1 may be implemented in hardware, software, or a combination thereof.

Based on the device 110 above, t present disclosure proposes a positioning method based on semantic information, which can be applied in some SLAM positioning scenarios, especially in visual SLAM. It can well solve the positioning problem in the case of dynamic scene changes and illumination changes.

FIG. 2 is an exemplary flowchart of a positioning method based on semantic information according to one embodiment. As an example, but not a limitation, the method can be implemented by the device 110. The method may include the following steps.

Step S110: Perform semantic segmentation on an acquired RGBD image to obtain a semantic label of each pixel of the RGBD image.

Semantic segmentation and semantic mapping are the foundation of semantic localization. Before performing semantic feature description and semantic positioning, it needs to perform semantic segmentation and semantic mapping. Exemplarily, a deep camera mounted on devices such as robots and autonomous vehicles can be used to capture RGBD images. Optionally, some preprocessing operations can be performed on the obtained RGBD images. Then, the semantic segmentation processing of RGBD images is performed based on deep learning to obtain the semantic label of each pixel of the images, that is, the pixel-level semantic label. It should be noted that based on deep learning, semantic segmentation training can be performed on sample images that have been semantically labeled in advance to obtain the corresponding semantic segmentation model.

RGBD images include two kinds of images: one is the color images having three channels: red, green, and blue; the other is depth images, similar to grayscale images, in which each pixel value reflects the distance between the sensor and the object in the images. Generally, the pixels in the RGB image and the depth image are registered, that is, they have a one-to-one correspondence.

Scenes can be perceived through semantic segmentation to distinguish and determine the types of dynamic objects and static objects in the scenes, so as to effectively eliminate the interference of dynamic objects on positioning. Moreover, semantic segmentation is robust to illumination, and semantic positioning based on semantic segmentation results can avoid the problem of sensitivity to illumination in conventional methods.

Step S120: Perform reconstruction of a point cloud based on the RGBD image and mapping the semantic label of each pixel of the RGBD image into the point cloud to respectively obtain a semantic point cloud of a current frame with the semantic labels and a three-dimensional scene semantic map with the semantic labels.

In one embodiment, a single-frame point cloud and an entire 3D scene can be reconstructed according to a depth image and camera internal parameters in the RGBD image. That is, the single-frame point cloud and the point cloud map of the entire scene can be reconstructed. At the same time, during the reconstruction process, the semantic label of each pixel is mapped to the reconstructed dense point cloud map to obtain a current-frame point cloud with semantic labels (i.e., the semantic point cloud of the current frame) and a scene point cloud map with semantic labels (i.e., the 3D scene semantic map). At this point, the semantic mapping is completed. Since the 3D point clouds in the semantic point cloud of the current frame and the 3D scene semantic map have semantic labels, they are also referred to as 3D semantic point clouds.

S130: Generate two-dimensional discrete semantic feature points for each of three-dimensional semantic point clouds in the current frame and the semantic map to obtain a corresponding two-dimensional semantic feature point image, and perform a three-dimensional semantic feature description on each feature point in the two-dimensional semantic feature point image.

In one embodiment, considering that feature matching in three-dimensional space is more likely to cause matching failure than in two-dimensional space, and the sampling consistency algorithm has fewer interior points after screening, feature description and feature matching are first performed in two-dimensional space, and then three-dimensional semantic description is performed on these feature points in combination with three-dimensional geometric information.

Figure 3:
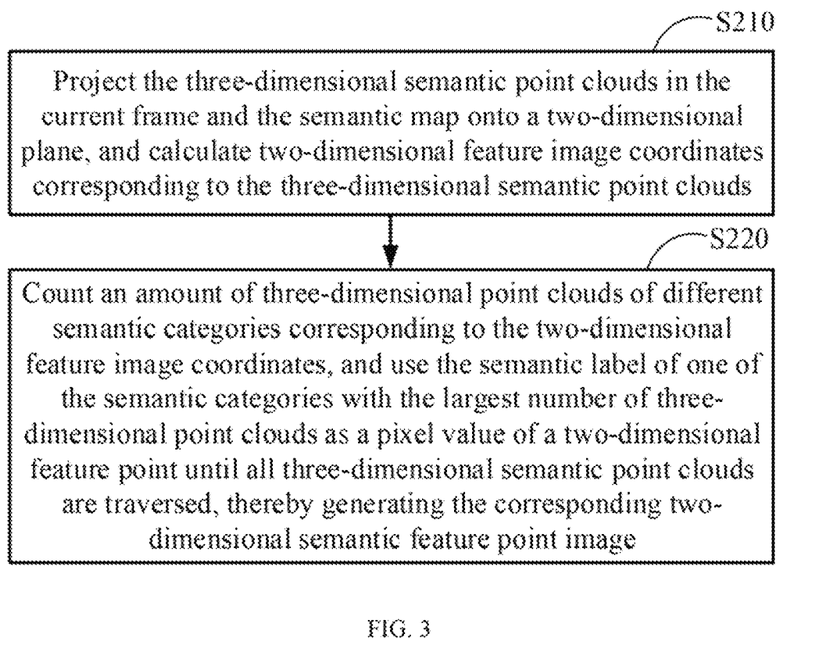
FIG. 3 is an exemplary flowchart of a method for semantic feature point generation according to one embodiment.

Generating two-dimensional discrete semantic feature points means performing two-dimensional discretization on the reconstructed three-dimensional point clouds to obtain feature points with semantic label information for constructing two-dimensional images. In one embodiment, as shown in FIG. 3, the process of generating two-dimensional discrete semantic feature points may include the following steps.

Step S210: Project the three-dimensional semantic point clouds in the current frame and the semantic map onto a two-dimensional plane, and calculate two-dimensional feature image coordinates corresponding to the three-dimensional semantic point clouds.

Each 3D point cloud in the current frame and semantic map can be transformed from a camera coordinate system to a coordinate system in which x-axis and y-axis are parallel to a supporting surface (e.g., ground, floor, road surface, etc.) where the device 100 is located and z-axis is perpendicular to the supporting surface. The minimum and maximum values for each coordinate in the 3D semantic point clouds are then solved. In one embodiment, the supporting surface is the ground. It should be noted that projection plane for the 3D point clouds is not limited to the ground, but can be other planes selected according to the actual scene. An image resolution after two-dimensional discretization is then calculated according to the resolution of the two-dimensional discretization, the minimum values and the maximum values, and the two-dimensional feature image coordinates corresponding to the three-dimensional semantic point clouds in the image resolution are then calculated.

In one embodiment, the minimum and maximum values of each coordinate of the 3D semantic point clouds are expressed as follows: $P_{min}=(x_{min}, y_{min}, z_{min})$ and $P_{max}=(x_{max}, y_{max}, z_{max})$. The image resolution after two-dimensional discretization can be expressed as follows: $(I_w, I_h)=(\lfloor(x_{max}-x_{min})/r\rfloor, \lfloor(y_{max}-y_{min})/r\rfloor)$, where r represents the image resolution after two-dimensional discretization, $\lfloor \bullet \rfloor$ is a symbol that refers rounding the number within the symbol to the nearest integer, and $I_w$ and $I_h$ represent the width and height of the image size, respectively.

Therefore, according to the x-coordinate and y-coordinate values of each point in the semantic point clouds, the 2D image coordinates corresponding to each 3D point can be obtained according to the following equation: $(u,v)=(\lfloor(x-x_{min})/r\rfloor, \lfloor(y-y_{min})/r\rfloor)$, where $(u,v)$ represents 2D feature image coordinates, and $(x, y)$ represent the coordinate values of the 3D semantic point cloud on the x-axis and y-axis.

Figure 4:
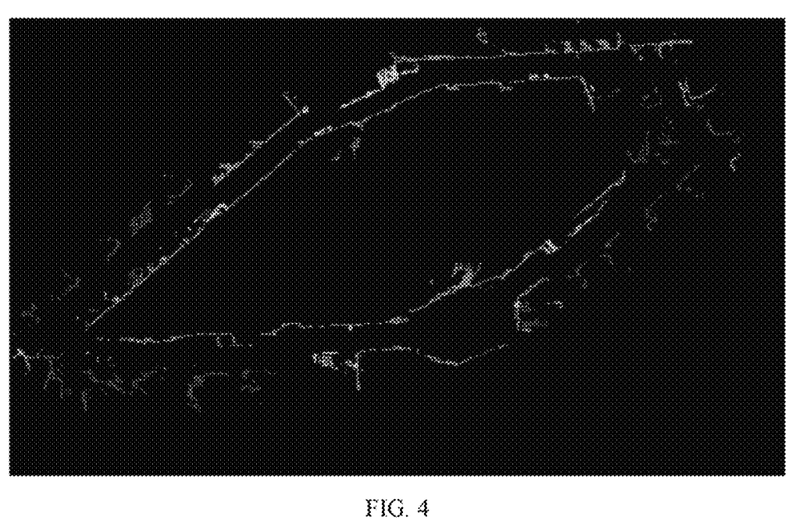
FIG. 4 is a schematic diagram of a two-dimensional feature image.

For example, FIG. 4 shows a two-dimensional feature image including a number of two-dimensional feature points. The two-dimensional feature image has different semantic categories represented by different colors (not shown).

Step S220: Count an amount of three-dimensional point clouds of different semantic categories corresponding to the two-dimensional feature image coordinates, and use the semantic label of one of the semantic categories with the largest number of three-dimensional point clouds as a pixel value of a two-dimensional feature point until all three-dimensional semantic point clouds are traversed, thereby generating the corresponding two-dimensional semantic feature point image.

A 3D semantic point cloud usually includes multiple semantic categories, which are denoted as c here. In one embodiment, after the two-dimensional feature image coordinates corresponding to each point cloud are obtained, the number of semantic three-dimensional points of different categories corresponding to each image coordinate is counted. Then, the corresponding semantic label with the largest number of semantic category points is assigned to the two-dimensional feature point (also referred to as pixel point) corresponding to the current image coordinates, and the pixel value of the feature point is the assigned semantic category label. Until all the 3D semantic point clouds are traversed, the corresponding 2D semantic feature point image can be obtained.

Then, after the two-dimensional semantic feature points are generated, 3D semantic feature description is performed on semantic feature points based on three-dimensional spatial geometric features. By simultaneously considering the 3D spatial geometric information and semantic category information of features, the robustness of semantic feature matching can be improved.

Figure 5:
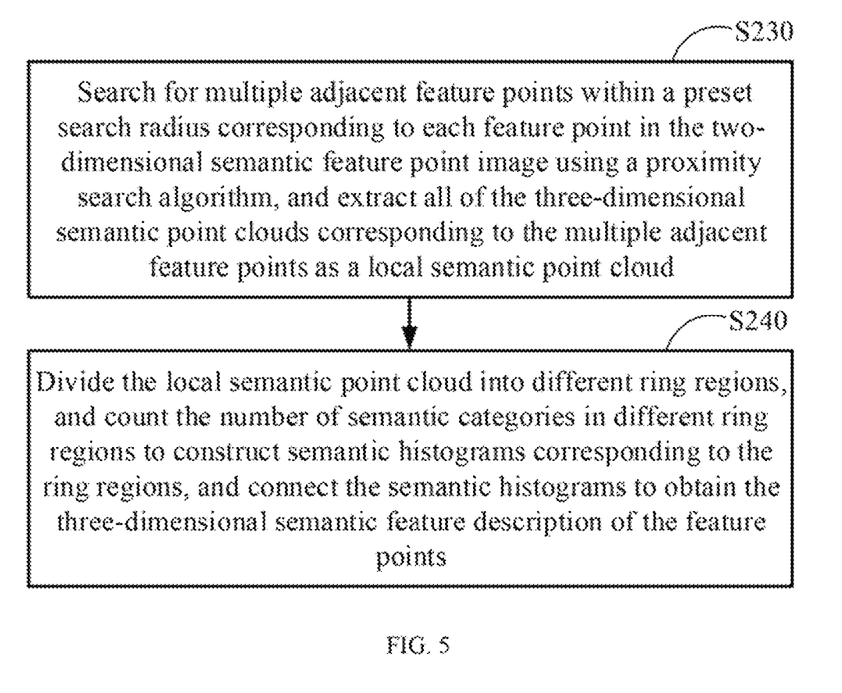
FIG. 5 is an exemplary flowchart of a method for performing 3D semantic feature description.

Referring to FIG. 5, in one embodiment, performing 3D semantic feature description on each feature point in the 2D semantic feature point image may include the following steps.

Step S230: Search for multiple adjacent feature points within a preset search radius corresponding to each feature point in the two-dimensional semantic feature point image using a proximity search algorithm, and extract all of the three-dimensional semantic point clouds corresponding to the multiple adjacent feature points as a local semantic point cloud.

In one embodiment, during the generation process of the above-mentioned two-dimensional semantic feature points, the corresponding relationship between the three-dimensional points and the two-dimensional feature points can be recorded at the same time. In order to realize the 3D semantic feature description, a local semantic feature at each feature point can be extracted based on the 3D semantic point cloud. For example, in the local feature description process of each two-dimensional feature point, a neighbor search algorithm such as a two-dimensional K-D tree can be used to search for nearby feature points within a certain search radius corresponding to each feature point. Then all 3D semantic point clouds corresponding to these neighboring feature points are extracted. The extracted semantic point clouds have different semantic labels. It can be understood that the search radius can be set according to actual needs, which is not limited here.

Step S240: Divide the local semantic point cloud into different ring regions, and count the number of semantic categories in different ring regions to construct semantic histograms corresponding to the ring regions, and connect the semantic histograms to obtain the three-dimensional semantic feature description of the feature points.

In order to effectively combine the local geometric information and semantic information, the obtained local semantic point cloud is divided into different ring regions to ensure the rotation invariance of the local feature description, which is convenient for feature matching of arbitrary rotation transformation. Exemplarily, a proximity search algorithm of a 3D point cloud such as a K-D tree search algorithm can be used for the division of the ring regions to obtain multiple different regions. Then, semantic category search and count statistics are performed on these regions.

In one embodiment, the radius of the local semantic point cloud is R, and the number of the ring regions is $N_R$. The rule for counting the number of the semantic categories in the different ring regions is as follows: performing a search in a circular area with a radius of $R/N_R$ and in one of the ring regions with an inner diameter of $k*R/N_R$ and an outer diameter of $(k+1)*R/N_R$ until all of the ring regions are searched, where k is an integer and is greater than or equal to 1 and less than or equal to $N_R-1$. In this approach, different regions can be searched at the same time after the local semantic point cloud is divided into different ring regions.

In another embodiment, a circular area with a radius of $R/N_R$ can be searched first, the number of points of different semantic categories contained in the circular area can be counted, and a histogram of semantic categories in the area can be constructed. Then, the point cloud within the searched circular area with radius $R/N_R$ is removed from the local semantic point cloud. Area search is performed and the number of semantic points is counted for the area with a radius of $2R/N_R$. By repeating the operations above, the last area corresponding to the radius of $N_R*R/N_R$ can be searched and the number of semantic points can be counted.

Figure 6:
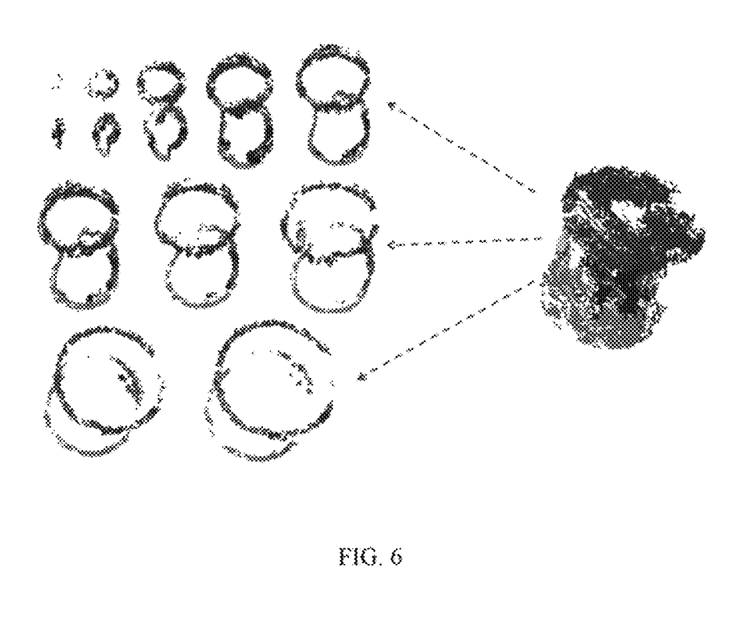
FIG. 6 is a schematic diagram of semantic rings.

Finally, the semantic histograms of the above-mentioned $N_R$ regions are connected to form a three-dimensional semantic feature description at the semantic feature point. FIG. 6 shows semantic point clouds corresponding to rings with different radii. The feature dimension of each semantic feature point at this time is $N_R*c$.

Step S140: Perform feature matching on all feature points in the current frame and all feature points in the semantic map to obtain positioning information based on the three-dimensional semantic feature description.

Feature matching is to match the description of all semantic feature points in the current frame with the description of the corresponding feature points on the map. For the matching process of the step S140, for example, in one embodiment, the feature points with the same semantic label in the current frame and the semantic map can be directly matched to obtain a corresponding number of matching pairs. The obtained matching pairs can be used to determine the current pose, and then obtain its positioning information in two-dimensional space. It can be understood that matching the same semantic labels directly can improve the matching speed on the one hand, and also help to improve the matching success rate on the other hand.

In addition, in some scenarios, if the feature points of the current frame are directly matched with all the feature points of the map, due to the feature similarity, the number of matching point pairs that are actually successfully matched may be relatively small, resulting in low positioning accuracy or positioning errors. To solve this problem, a registration scheme based on sub-maps is proposed here Referring to FIG. 7, in one embodiment, step S140 may include the following steps.

Figure 7:
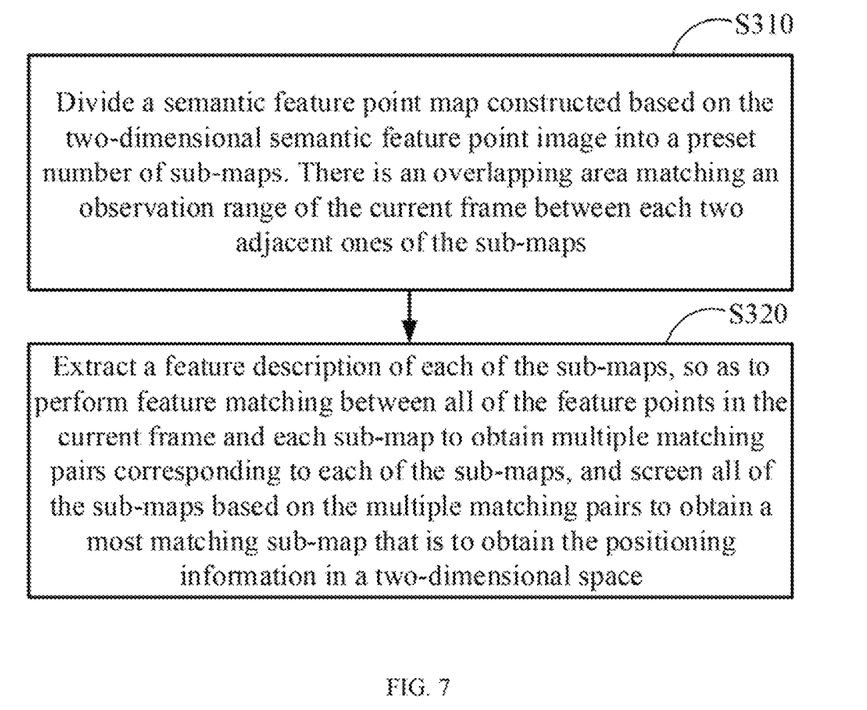
FIG. 7 is an exemplary flowchart of a method for feature matching according to one embodiment.

Step S310: Divide a semantic feature point map constructed based on the two-dimensional semantic feature point image into a preset number of sub-maps. There is an overlapping area matching an observation range of the current frame between each two adjacent ones of the sub-maps.

By dividing the entire two-dimensional semantic feature point map into multiple sub-maps, it should be ensured that there are overlapping areas between the sub-maps, so that any position of the current frame relative to the map can be matched with a sub-map. The overlapping areas can be set according to the observation range of the current frame. For example, each overlapping area can be equal to the observation range of the current frame. However, in some embodiments, each overlapping area can be smaller or larger, which can be adjusted according to actual scenes.

Step S320: Extract a feature description of each of the sub-maps, so as to perform feature matching between all of the feature points in the current frame and each sub-map to obtain multiple matching pairs corresponding to each of the sub-maps, and screen all of the sub-maps based on the multiple matching pairs to obtain a most matching sub-map that is to obtain the positioning information in a two-dimensional space.

After the semantic feature point map is divided into the sub-maps, the feature description of each sub-map can be extracted, and then the current frame is matched with each sub-map. For example, it is assumed that the number of feature points in the current frame is $N_{source}$, the sub-maps have $N_{target}$ feature points, and the dimension of each feature descriptor is $N_R*c$. A K-D tree of $N_R*c$ dimension can be first established using the nearest neighbor open-source library such as FLANN. Then through the k-nearest neighbor search, a search is performed in each sub-map to obtain the two features closest to each feature point of the current frame. If the ratio of the Euclidean distance of the nearest neighbor to the Euclidean distance of the second nearest neighbor feature is less than the preset threshold $\delta$, it is determined that the sub-map and the nearest neighbor feature are a matching pair. Otherwise, the matching pair is not retained. In this way, a certain number of matching pairs can be obtained between the current frame and each sub-map.

However, since errors may exist in these matching relationships, it needs to select the best matching sub-map. For example, when performing sub-map screening, the corresponding transformation matrix can be solved by continuously randomly selecting the matching pairs. Then the interior points for all matching pairs are found, and the sub-map with the largest number of interior points are determined as the most matching sub-map. This process is also called the RANSAC algorithm. Finally, the two-dimensional rotation and translation matrix is calculated according to the coordinates of the matching points, so as to further calculate positioning information. It can be understood that this process ensures that the relative distance between the matching pairs will not be too small. Through space constraint, the probability of successful matching can be effectively improved, and the robustness of feature matching can be improved.

The above-mentioned process has completed the positioning of the two-dimensional space. According to the embodiments of the present disclosure, pixel-level semantic segmentation is performed first. Then, after obtaining the current frame semantic point cloud with semantic labels and the three-dimensional scene semantic map with semantic labels, two-dimensional discretized semantic feature points are generated and then three-dimensional semantic feature description is performed on the feature points using 3D geometric information. Finally, semantic feature matching is performed to realize positioning. The 3D semantic feature description based on 2D constraints is realized through the effective fusion of semantic segmentation results and 3D geometric information. Then, semantic features are used for efficient feature matching and positioning, which can effectively improve the efficiency of feature matching and reduce the probability of false matching.

Due to the low resolution of the two-dimensional semantic feature point map, the positioning accuracy is relatively low, and the ground position correction is not performed in the Z-axis direction. For this reason, one embodiment of the present disclosure proposes performing high-precision three-dimensional positioning on the basis of two-dimensional positioning.

Figure 8:
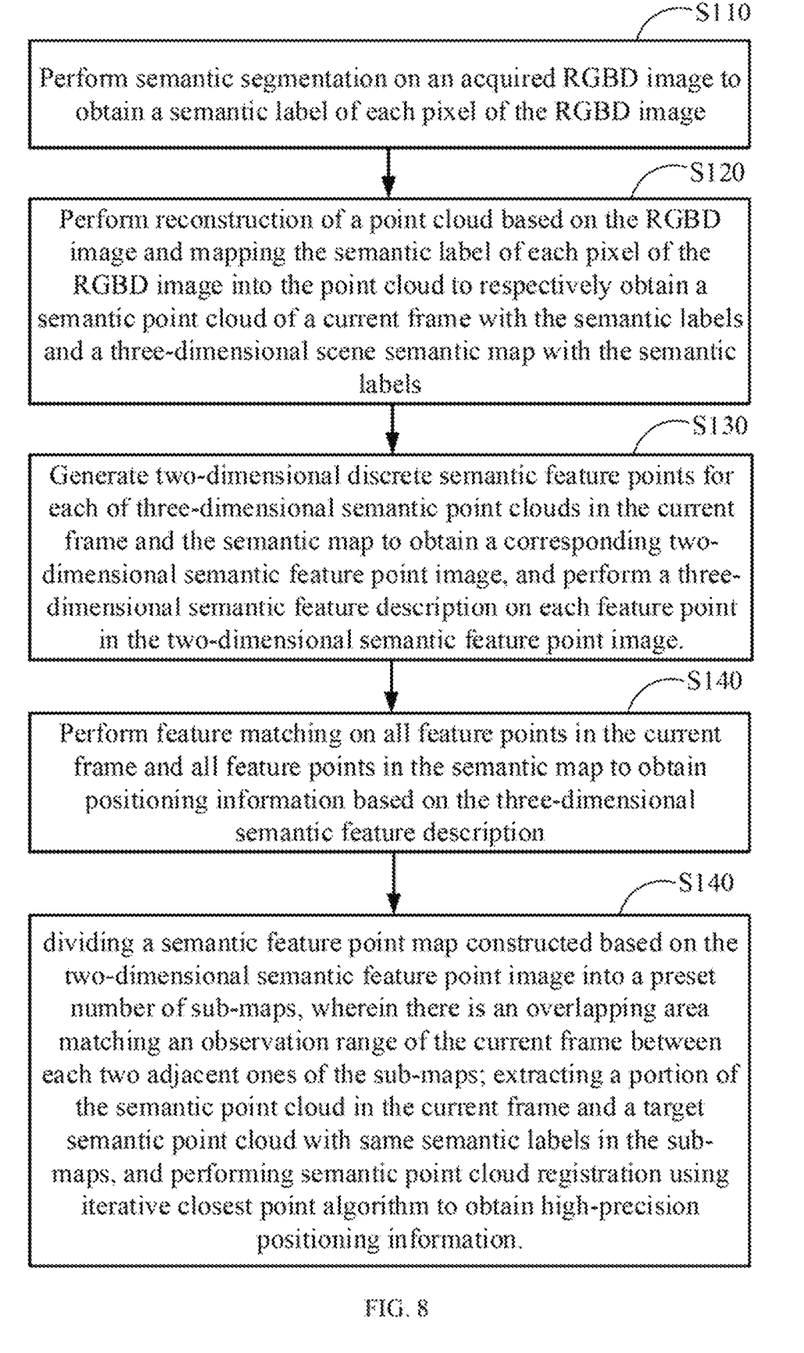
FIG. 8 is an exemplary flowchart of a positioning method according to another embodiment.

Referring to FIG. 8, in one embodiment, the method may include the following steps after step S140.

Step S150: Divide the semantic feature point map constructed based on the two-dimensional semantic feature point image into a preset number of sub-maps. There is an overlapping area matching an observation range of the current frame between each two adjacent ones of the sub-maps. This step is the same as the above-mentioned step S310, and will not be repeated here. If the semantic feature point map has been divided before, the sub-maps can be used here. Then, a portion of the semantic point clouds in the current frame and the target semantic point cloud with the same semantic labels in the sub-maps are extracted. Then, iterative closest point algorithm is used for semantic point cloud registration to obtain high-precision positioning information.

After completing the two-dimensional positioning, it is used as the initial position. A portion of the semantic point clouds in the current frame and the sub-map point cloud of the same semantic category are extracted again. Then, the iterative closest point algorithm is used to register the two high-precision point clouds to achieve the final positioning.

In one embodiment, considering the efficiency and robustness of a fine positioning algorithm, after extracting the high-precision point clouds, a voxel filtering approach can be used to down-sample the extracted point clouds. Using the down-sampled point clouds for the above-mentioned registration operation can effectively reduce the sensitivity of the iterative closest point algorithm to the initial position, and can significantly increase the registration speed. Although the point clouds are down-sampled in this process, the relative positional relationship between point clouds constrains the actual object geometry. Therefore, the impact on the accuracy of fine positioning is limited, and the accuracy of fine positioning can still be guaranteed under the premise of proper downsampling.

It should be understood that sequence numbers of the foregoing processes do not mean particular execution sequences. The execution sequences of the processes should be determined based on functions and internal logic of the processes, and should not be construed as any limitation on the implementation processes of the embodiments of the present disclosure.

Referring to FIG. 9, in one embodiment, a semantic information-based positioning device 100 may include an image semantic segmentation module 10, a semantic map construction module 20, a semantic feature description module 30, and a matching and positioning module 40. The image semantic segmentation module 10 is to perform semantic segmentation on an acquired RGBD image to obtain a semantic label of each pixel of the RGBD image. The semantic map construction module 20 is to perform reconstruction of a point cloud based on the RGBD image and mapping the semantic label of each pixel of the RGBD image into the point cloud to respectively obtain a semantic point cloud of a current frame with the semantic labels and a three-dimensional scene semantic map with the semantic labels. The semantic feature description module 30 is to generate two-dimensional discrete semantic feature points for each of three-dimensional semantic point clouds in the current frame and the semantic map to obtain a corresponding two-dimensional semantic feature point image, and perform a three-dimensional semantic feature description on each feature point in the two-dimensional semantic feature point image. The matching and positioning module 40 is to perform feature matching on all feature points in the current frame and all feature points in the semantic map to obtain positioning information based on the three-dimensional semantic feature description.

In one embodiment, the matching and positioning module 40 is further to: divide a semantic feature point map constructed based on the two-dimensional semantic feature point image into a preset number of sub-maps, wherein there is an overlapping area matching an observation range of the current frame between each two adjacent ones of the sub-maps; and extract a portion of the semantic point cloud in the current frame and a target semantic point cloud with same semantic labels in the sub-maps, and perform semantic point cloud registration using iterative closest point algorithm to obtain high-precision positioning information.

It can be understood that the device in the embodiments above corresponds to the method in the embodiments above. The basic principles and technical effects of the device are the same as the aforementioned method. For a brief description, for parts not mentioned in this device embodiment, reference can be made to corresponding description in the method embodiments.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented positioning method based on semantic information, the method comprising:
    performing semantic segmentation on an acquired RGBD image to obtain a semantic label of each pixel of the RGBD image;
    performing reconstruction of a point cloud based on the RGBD image and mapping the semantic label of each pixel of the RGBD image into the point cloud to respectively obtain a semantic point cloud of a current frame with the semantic labels and a three-dimensional scene semantic map with the semantic labels;
    generating two-dimensional discrete semantic feature points for each of three-dimensional semantic point clouds in the current frame and the semantic map to obtain a corresponding two-dimensional semantic feature point image, and performing a three-dimensional semantic feature description on each feature point in the two-dimensional semantic feature point image; and
    performing feature matching on all feature points in the current frame and all feature points in the semantic map to obtain positioning information based on the three-dimensional semantic feature description.

2. The method of claim 1, further comprising, after obtaining the positioning information,
dividing a semantic feature point map constructed based on the two-dimensional semantic feature point image into a preset number of sub-maps, wherein there is an overlapping area matching an observation range of the current frame between each two adjacent ones of the sub-maps;
extracting a portion of the semantic point cloud in the current frame and a target semantic point cloud with same semantic labels in the sub-maps, and performing semantic point cloud registration using iterative closest point algorithm to obtain high-precision positioning information.

3. The method of claim 1, wherein generating two-dimensional discrete semantic feature points for each of three-dimensional semantic point clouds in the current frame and the semantic map to obtain the corresponding two-dimensional semantic feature point image comprises:
projecting the three-dimensional semantic point clouds in the current frame and the semantic map onto a two-dimensional plane, and calculating two-dimensional feature image coordinates corresponding to the three-dimensional semantic point clouds; and
counting an amount of three-dimensional point clouds of different semantic categories corresponding to the two-dimensional feature image coordinates, using the semantic label of one of the semantic categories with a largest number of three-dimensional point clouds as a pixel value of a two-dimensional feature point until all three-dimensional semantic point clouds are traversed, thereby generating the corresponding two-dimensional semantic feature point image.

4. The method of claim 3, wherein calculating two-dimensional feature image coordinates corresponding to the three-dimensional semantic point clouds comprises:
transforming the three-dimensional semantic point clouds from a camera coordinate system to a coordinate system in which an x-axis and a y-axis are parallel to a ground and a z-axis is vertical to the ground, and solving minimum and maximum values of each coordinate in the three-dimensional semantic point clouds; and
calculating an image resolution after two-dimensional discretization according to a resolution of the two-dimensional discretization, the minimum values and the maximum values, and calculating the two-dimensional feature image coordinates corresponding to the three-dimensional semantic point clouds in the image resolution.

5. The method of claim 1, wherein performing the three-dimensional semantic feature description on each feature point in the two-dimensional semantic feature point image comprises:
searching for multiple adjacent feature points within a preset search radius corresponding to each feature point in the two-dimensional semantic feature point image using a proximity search algorithm, and extracting all of the three-dimensional semantic point clouds corresponding to the multiple adjacent feature points as a local semantic point cloud; and
dividing the local semantic point cloud into different ring regions, and counting an amount of semantic categories in different ring regions to construct semantic histograms corresponding to the ring regions, and connecting the semantic histograms to obtain the three-dimensional semantic feature description of the feature points.

6. The method of claim 5, wherein a radius of the local semantic point cloud is R, and an amount of the ring regions is $N_R$, a rule for counting the amount of the semantic categories in the different ring regions is as follows: performing a search in a circular area with a radius of $R/N_R$ and in one of the ring regions with an inner diameter of $k*R/N_R$ and an outer diameter of $(k+1)*R/N_R$ until all of the ring regions are searched, where k is an integer and is greater than or equal to t and less than or equal to $N_R-1$.

7. The method of claim 1, wherein performing feature matching on all feature points in the current frame and all feature points in the semantic map comprises:
matching feature points in the current frame with the feature points in the semantic map with same semantic labels to obtain a plurality of matching pairs, wherein the matching pairs are configured to obtain the positioning information in a two-dimensional space.

8. The method of claim 1, wherein performing feature matching on all feature points in the current frame and all feature points in the semantic map comprises:
dividing a semantic feature point map constructed based on the two-dimensional semantic feature point image into a preset number of sub-maps, wherein there is an overlapping area matching an observation range of the current frame between each two adjacent ones of the sub-maps; and
extracting a feature description of each of the sub-maps, so as to perform feature matching between all of the feature points in the current frame and each sub-map to obtain multiple matching pairs corresponding to each of the sub-maps, and screening all of the sub-maps based on the multiple matching pairs to obtain a most matching sub-map that is configured to obtain the positioning information in a two-dimensional space.

9. The method of claim 8, wherein screening all of the sub-maps based on the multiple matching pairs comprises:
randomly selecting the matching pairs to solve a corresponding transformation matrix, and solving interior points for all of the matching pairs, and using the sub-map with a largest number of interior points as the most matching sub-map.

10. A device comprising:
one or more processors; and
a memory coupled to the one or more processors, the memory storing programs that, when executed by the one or more processors, cause performance of operations comprising:
performing semantic segmentation on an acquired RGBD image to obtain a semantic label of each pixel of the RGBD image;
performing reconstruction of a point cloud based on the RGBD image and mapping the semantic label of each pixel of the RGBD image into the point cloud to respectively obtain a semantic point cloud of a current frame with the semantic labels and a three-dimensional scene semantic map with the semantic labels;
generating two-dimensional discrete semantic feature points for each of three-dimensional semantic point clouds in the current frame and the semantic map to obtain a corresponding two-dimensional semantic feature point image, and performing a three-dimensional semantic feature description on each feature point in the two-dimensional semantic feature point image; and performing feature matching on all feature points in the current frame and all feature points in the semantic map to obtain positioning information based on the three-dimensional semantic feature description.

11. The device of claim 10, wherein the operations further comprise, after obtaining the positioning information,
dividing a semantic feature point map constructed based on the two-dimensional semantic feature point image into a preset number of sub-maps, wherein there is an overlapping area matching an observation range of the current frame between each two adjacent ones of the sub-maps; and
extracting a portion of the semantic point cloud in the current frame and a target semantic point cloud with same semantic labels in the sub-maps, and performing semantic point cloud registration using iterative closest point algorithm to obtain high-precision positioning information.

12. The device of claim 10, wherein generating two-dimensional discrete semantic feature points for each of three-dimensional semantic point clouds in the current frame and the semantic map to obtain the corresponding two-dimensional semantic feature point image comprises:
projecting the three-dimensional semantic point clouds in the current frame and the semantic map onto a two-dimensional plane, and calculating two-dimensional feature image coordinates corresponding to the three-dimensional semantic point clouds; and
counting an amount of three-dimensional point clouds of different semantic categories corresponding to the two-dimensional feature image coordinates, using the semantic label of one of the semantic categories with a largest number of three-dimensional point clouds as a pixel value of a two-dimensional feature point until all three-dimensional semantic point clouds are traversed, thereby generating the corresponding two-dimensional semantic feature point image.

13. The device of claim 12, wherein calculating two-dimensional feature image coordinates corresponding to the three-dimensional semantic point clouds comprises:
transforming the three-dimensional semantic point clouds from a camera coordinate system to a coordinate system in which an x-axis and a y-axis are parallel to a ground and a z-axis is vertical to the ground, and solving minimum and maximum values of each coordinate in the three-dimensional semantic point clouds; and
calculating an image resolution after two-dimensional discretization according to a resolution of the two-dimensional discretization, the minimum values and the maximum values, and calculating the two-dimensional feature image coordinates corresponding to the three-dimensional semantic point clouds in the image resolution.

14. The device of claim 10, wherein performing the three-dimensional semantic feature description on each feature point in the two-dimensional semantic feature point image comprises:
searching for multiple adjacent feature points within a preset search radius corresponding to each feature point in the two-dimensional semantic feature point image using a proximity search algorithm, and extracting all of the three-dimensional semantic point clouds corresponding to the multiple adjacent feature points as a local semantic point cloud; and
dividing the local semantic point cloud into different ring regions, and counting an amount of semantic categories in different ring regions to construct semantic histograms corresponding to the ring regions, and connecting the semantic histograms to obtain the three-dimensional semantic feature description of the feature points.

15. The device of claim 14, wherein a radius of the local semantic point cloud is R, and an amount of the ring regions is $N_R$, a rule for counting the amount of the semantic categories in the different ring regions is as follows: performing a search in a circular area with a radius of $R/N_R$ and in one of the ring regions with an inner diameter of $k*R/N_R$ and an outer diameter of $(k+1)*R/N_R$ until all of the ring regions are searched, where k is an integer and is greater than or equal to 1 and less than or equal to $N_R-1$.

16. The device of claim 10, wherein performing feature matching on all feature points in the current frame and all feature points in the semantic map comprises:
matching feature points in the current frame with the feature points in the semantic map with same semantic labels to obtain a plurality of matching pairs, wherein the matching pairs are configured to obtain the positioning information in a two-dimensional space.

17. The device of claim 10, wherein performing feature matching on all feature points in the current frame and all feature points in the semantic map comprises:
dividing a semantic feature point map constructed based on the two-dimensional semantic feature point image into a preset number of sub-maps, wherein there is an overlapping area matching an observation range of the current frame between each two adjacent ones of the sub-maps; and
extracting a feature description of each of the sub-maps, so as to perform feature matching between all of the feature points in the current frame and each sub-map to obtain multiple matching pairs corresponding to each of the sub-maps, and screening all of the sub-maps based on the multiple matching pairs to obtain a most matching sub-map that is configured to obtain the positioning information in a two-dimensional space.

18. The device of claim 17, wherein screening all of the sub-maps based on the multiple matching pairs comprises:
randomly selecting the matching pairs to solve a corresponding transformation matrix, and solving interior points for all of the matching pairs, and using the sub-map with a largest number of interior points as the most matching sub-map.

19. A non-transitory computer-readable storage medium storing instructions that, when executed by at least one processor, cause the at least one processor to perform a method, the method comprising:
performing semantic segmentation on an acquired RGBD image to obtain a semantic label of each pixel of the RGBD image;
performing reconstruction of a point cloud based on the RGBD image and mapping the semantic label of each pixel of the RGBD image into the point cloud to respectively obtain a semantic point cloud of a current frame with the semantic labels and a three-dimensional scene semantic map with the semantic labels;
generating two-dimensional discrete semantic feature points for each of three-dimensional semantic point clouds in the current frame and the semantic map to obtain a corresponding two-dimensional semantic feature point image, and performing a three-dimensional semantic feature description on each feature point in the two-dimensional semantic feature point image; and performing feature matching on all feature points in the current frame and all feature points in the semantic map to obtain positioning information based on the three-dimensional feature description.

20. The non-transitory computer-readable storage medium of claim 19, where the method further comprises, after obtaining the positioning information, dividing a semantic feature point map constructed based on the two-dimensional semantic feature point image into a preset number of sub-maps, wherein there is an overlapping area matching an observation range of the current frame between each two adjacent ones of the sub-maps;

extracting a portion of the semantic point cloud in the current frame and a target semantic point cloud with same semantic labels in the sub-maps, and performing semantic point cloud registration using iterative closest point algorithm to obtain high-precision positioning information.

\* \* \* \* \*